W. D. DREISKE.
INDICATING INSTRUMENT.
APPLICATION FILED NOV. 11, 1918.

1,428,363.

Patented Sept. 5, 1922.
2 SHEETS—SHEET 1.

W. D. DRESKE.
INDICATING INSTRUMENT.
APPLICATION FILED NOV. 11, 1918.

1,428,363.

Patented Sept. 5, 1922.

Patented Sept. 5, 1922.

1,428,363

UNITED STATES PATENT OFFICE.

WILLIAM D. DREISKE, OF OAK PARK, ILLINOIS.

INDICATING INSTRUMENT.

Application filed November 11, 1918. Serial No. 262,064.

*To all whom it may concern:*

Be it known that I, WILLIAM D. DREISKE, a citizen of the United States of America, and a resident of Oak Park, Illinois, have invented a certain new and useful Improvement in Indicating Instruments, of which the following is a specification.

This invention relates to indicating instruments in general, but more particularly to those which are responsive to varying conditions of the instrumentalities to which the instrument is connected, and especially to those which are employed, for example, to indicate the changing conditions in a furnace, so that the attendant may see at a glance whether the draft requires adjustment or regulation, or whether something else should be done to establish the desired or proper conditions in the furnace. More specifically considered, the invention relates to draft gages for furnaces, such, for example, as those which are so connected that one gage indicates the condition of the draft in the furnace while the other gage will indicate the differential between the draft at the damper and the draft over the fire. The invention, however, as stated, is not limited to indicating instruments for any particular purpose.

Generally stated, the object of the invention is to provide an instrument of the foregoing general character, in which the graduations or marks on the face of the instrument are so arranged that the instrument will read more correctly, or function more accurately, under varying or changing conditions of the instrumentalities by which the instrument is controlled, and whereby the latter will serve its purpose more satisfactorily than those heretofore employed for certain purposes; to provide novel and simple means for adjusting the graduations or indicating marks on the face of the instrument, thereby to rectify the latter with respect to changes or variations in the instrumentalities by which the instrument is controlled; and to provide certain details and features of construction and combinations tending to improve the general efficiency of an instrument of this particular character, and to render the same more reliable than certain devices heretofore employed for this purpose.

It is also an object to entirely dispense with the use of certain features of construction heretofore considered necessary and desirable in the construction of an instrument of this character.

To these and other useful ends the invention consists in matters hereinafter set forth and claimed and shown in the accompanying drawings, in which—

Figure 1:
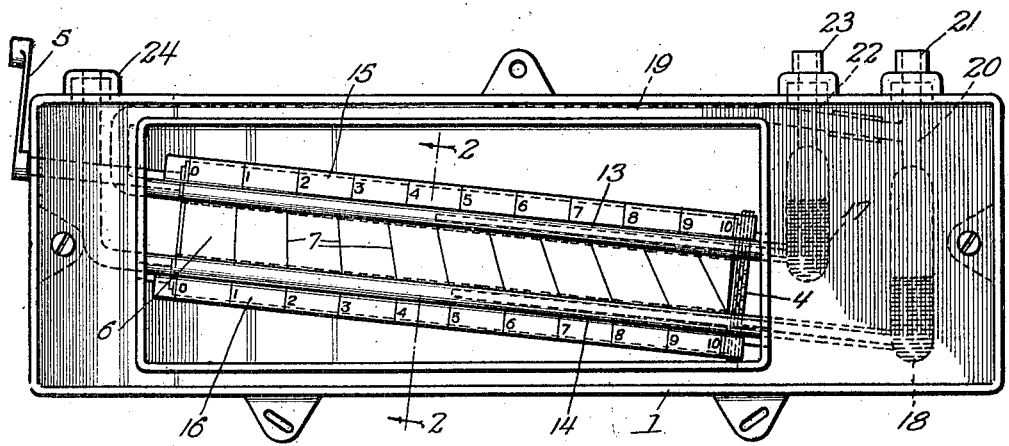
Fig. 1 is a front elevation of a furnace draft gage embodying the principles of the invention.
Figure 2:
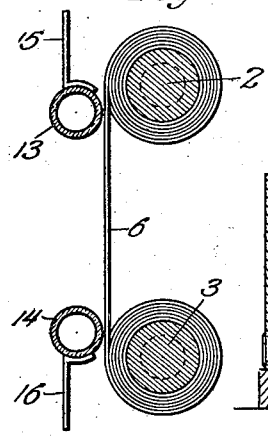
Fig. 2 is an enlarged section on line 2—2 in Fig. 1.

As thus illustrated, the invention comprises a suitable box or casing 1 in which are mounted the two rollers 2 and 3, in an inclined position, a sprocket chain 4 being employed to connect the two rollers together. A crank 5 is provided for rotating the upper roller, and when this is done, the two rollers will rotate in unison. The flexible sheet 6 is wound on said rollers, and is provided with an upper series of lines 7 which converge to a common point 8, and with a lower series of lines 9 which similarly converge to a common point 10, the upper lines meeting the lower lines along a horizontal line 11, which is not necessarily printed on the sheet, so that angles 12 are formed at the junctions between the upper and lower lines, these angles becoming more acute as they progress toward the right hand edge of the sheet. Upper and lower glass tubes 13 and 14 are disposed in front of the upper and lower rollers 2 and 3, adjacent the upper and lower scales 15 and 16, which latter are graduated or divided into equal spaces as shown. It will be seen that the angles 12 are preferably equidistant, and are opposite the marks or graduations on the scales 15 and 16 when the sheet 6 is adjusted into the position shown in Fig. 4. The tube 13 is connected to a bulb 17, and the tube 14 is connected to a somewhat larger bulb 18, within the box or casing. The other end of the tube 13 is connected through a tube 19 with the connection 20 which leads upwardly from the bulb 18 to the boss 21 on the top of the casing. The bulb 17 has a connection 22 with the boss 23 on the top of the casing. Also, it will be seen that the other end of the tube 14 is connected to the boss 24 on the top of the casing at the other end of the latter, so that the higher end of the tube 14 is open to the atmosphere. These tubes, it will be understood, are filled with colored liquids, such as the oils ordinarily used in draft gages, so that the position of the liquid in each tube is obvious at a glance.

Figure 6:
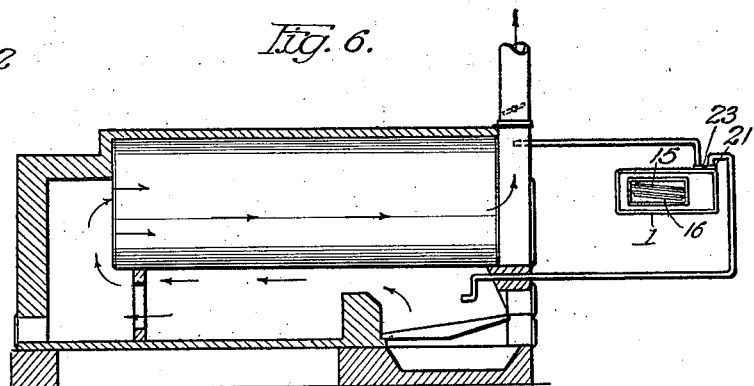
Fig. 6 is a diagram showing the method of connecting the instrument to a furnace.
Figure 3:
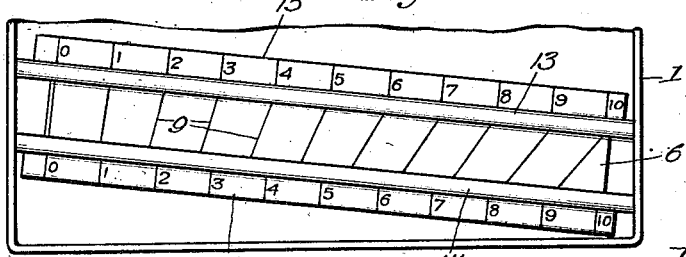
Fig. 3 is a view similar to Fig. 1, with certain portions broken away, and showing the indicating means adjusted for different conditions of the instrumentalities by which the instrument is controlled.
Figure 4:
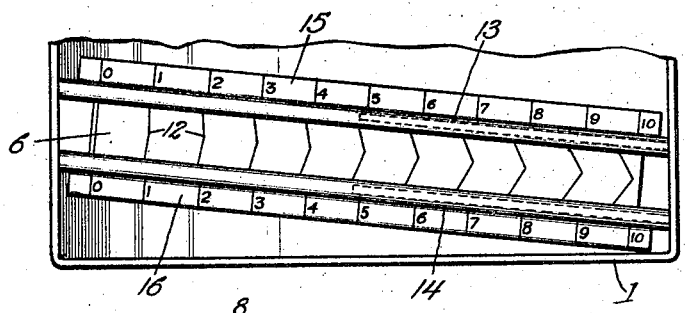
Fig. 4 is a view similar to Fig. 3, showing still a different adjustment of the indicating means.

Assuming that the instrument is to be used as a draft gage, to indicate the condition of the draft and the condition of the fire, and so forth, in a furnace, as shown in Fig. 6, the boss 21 will be connected to the furnace, while the boss 23 will be connected to the flue immediately in advance of the damper. With this arrangement the liquid in the upper tube 13 will always show the differential between the furnace pressure and the pressure at the damper, while the liquid in the tube 14 will simply show the furnace pressure, as compared with ordinary atmospheric pressure. Normally, the ends of the columns of liquids in the tubes 13 and 14 will stand preferably at zero on the upper and lower scales 15 and 16, and will move downward or to the right in these tubes when the furnace is in operation, owing to the suction or displacement of the liquid by the draft in the well known manner. For any certain furnace, therefore, draft, character of the fuel, and all other elements being carefully considered, the ends of the two columns of liquid may stand at five on both scales for the normal or ordinary load—that is to say, for a certain indicated pressure to be maintained on the steam gage of the boiler. In such case, the chart or indicating sheet 6 will be adjusted as shown in Fig. 4, so that the angles or points 12 on the line 11 will be approximately half way between the tubes, the liquid in each tube constituting a movable indicator. In such case, for an over load the liquid in both tubes may be maintained at seven or eight, for example, and for an under load the ends of the two columns of liquid can be maintained at two or three on the scale, or at any other point, depending upon the requirements; but in any event, because the normal load requires that the ends of both columns of liquid be maintained exactly opposite, say at five on the scale, the two liquids should always be opposite for either an over load or an under load. In practice, however, the thing does not always work out this way, for the draft is different in different furnaces, and different kinds of fuel will produce different conditions in one and the same furnace, so that more often the two liquids must be maintained at different points on the two scales, instead of at opposite points. For example, the situation may be such that the liquid in the lower tube 14 should always lead or be a little ahead of the liquid in the upper tube, in the downward movement of the two columns of liquid, and in that event the sheet 6 will be adjusted to bring the lines 7 crosswise of the space between the two tubes, as shown in Fig. 1, the lead of the lower liquid over the upper one becoming constantly greater as they move toward the right, this having been determined by geometric calculation, and hence the converging arrangement of said lines. In such case, the normal load may require that the ends of the two columns of liquid be maintained on the oblique line 7 which is shown approximately opposite five on the two scales in Fig. 1, while for an over load the two liquids should be kept opposite one of the oblique lines 7 farther to the right, and for an under load the two liquids should be kept opposite one of the oblique lines farther to the left; and thus the constantly increasing differential between the positions of the two liquids is maintained as they move downward to the right. On the other hand, for a different furnace, or perhaps for a different kind of fuel in the same furnace, or for some other reason, the liquid in the upper tube 13 may be required to always lead or be a little ahead of the liquid in the lower tube, in their movement downwardly toward the right, and in such case the sheet 6 is adjusted to bring the lines 9 into operative relation to the two indicators, as shown in Fig. 3, so that the first or zero line at the extreme left is exactly at right angles to the tubes 13 and 14, as is always the case, but whereby each succeeding line in the series is disposed at a lesser angle to the tubes, and these succeeding lines being inclined in a direction opposite to that of the lines shown in Fig. 1, because the two sets of lines converge toward different points. Of course, on the sheet 6 these lines can be drawn to the points 8 and 10, if desired, but on the other hand they can be made to extend only a portion of the distance from the line 11 to these points 8 and 10, as it would probably never be necessary to adjust the sheet to either extreme position, and hence those portions of the lines immediately adjacent the points 8 and 10 can be omitted if desired; but, in any event, these lines, regardless of their length, converge toward a common point above the line 11 and toward a common point below this line 11, for the purposes shown and described. Now with the graduations on the sheet adjusted as shown in Fig. 3, the two liquids for the average or ordinary load can stand opposite the line 9 which is approximately opposite five on the two scales, while for an over load the two liquids will stand opposite one of the oblique lines 9 to the right, and for an under load the two ends of the two columns of liquid should be maintained opposite one of the oblique lines farther to the left, so that in the movement of the two liquids to the right, the upper column of liquid will always lead or be a little ahead of the liquid in the lower tube, and this differential in the relative positions of the two liquids will increase as the liquids move downward or toward the right.

Instruments of this general class, for showing the conditions of a furnace with respect to draft, the condition of the fire, and so forth, involving the use of a plurality of draft gages, are employed to assist the attendant in maintaining the efficiency of the furnace. As is well known, the relative positions between the two columns of liquid in the two tubes will indicate various conditions in the furnace. When the two liquids are observed to be displaced from their normal positions, one way or the other, the attendant will understand what must be done to bring the two liquids back to their normal positions—that is to say, the attendant can judge whether it will be necessary to increase or diminish the draft, to increase or diminish the fire, or whether perhaps ashes and clinkers are interfering with the proper efficiency of the furnace, these methods being well understood. With the adjustment of the instrument shown in Fig. 1, it is possible, for example, that a change in fuel may require the two liquids to stand normally at a different point from that previously described, either to the right or left, but with the construction of the furnace and the flues and other elements remaining unchanged, the proper relative positions of the two liquids will always be on one of the lines 7, depending upon the amount of steam pressure desired; but with other conditions, such as a difference in the construction of the furnace, or a difference in the flues, the sheet 6 may have to be adjusted as shown in Fig. 3, or as shown in Fig. 4, although the latter is not common, the average situation being such that a differential must be maintained in the relative positions between the two liquids, instead of keeping them exactly opposite.

In this way, a standard instrument can be made, and calibrated, so to speak, with respect to the conditions obtaining in any particular furnace. Other instruments can then be made exactly like the first or standard instrument, and installed on different furnaces, each instrument being susceptible of adjustment or regulation to adapt it to the peculiar conditions of each furnace. In other words, each instrument can be rectified with respect to the conditions of the furnace upon which it is to be installed, without reconstruction of the instrument, and simply by adjustment of the sheet 6 to change the relation of the lines thereon to the parallel tubes in the manner explained. The same instrument, therefore, can be made to function properly on different furnaces, the indications, after the instrument is properly adjusted, always being correct, but which was not possible with some of the instruments heretofore employed for this purpose. In the adjustment of an instrument to the peculiar conditions of any particular furnace, the desired results may be obtained, for example, by establishing the desired conditions in the furnace, in all respects, within the judgment of the fireman or engineer, and by then noting where the ends of the two columns of liquid stand when the furnace is thus running under the most efficient conditions. If the liquid in the tube 14 is farther to the right than the liquid in the tube 13, the sheet 6 will then be adjusted until a line 7 is found which can be placed exactly opposite the ends of the two columns of liquid; but, on the other hand, if the liquid in the tube 13 is farther to the right than the liquid in the tube 14, then the sheet 6 will be adjusted until a line 9 is found which is at such an angle that it can be placed exactly opposite the ends of both columns of liquid. Ordinarily, the normal position for the ends of the two columns of liquid is somewhere at the middle of the instrument, leaving some leeway at either side thereof for an overload or an underload; but, as stated, conditions vary in different furnaces, and in the same furnace when subjected to different kinds of fuel and other varying conditions, and an original calibration which would answer for one furnace, or for certain conditions, would not serve the purpose at all for another purpose or for other conditions; and it is for this reason that means are provided for rectifying the calibration, so to speak, by changing the lines in the space between the two parallel indicators, in the manner shown and described.

As previously stated, the angularity of the lines 7 and 9 is a matter of geometric calculation, for this reason. For a certain furnace, for example, the two indicators, comprising the liquids in the tubes 13 and 14, will stand at different points on the two scales, so that a certain differential will exist as between the two indicators, which represents the proper ratio or proportion of the one indicator to the other. In order, therefore, to maintain the given or determined ratio, throughout the length of the scale, the differential must increase as the liquids move to the right, and must decrease as they move to the left, in the tubes 13 and 14, and the lines 7 and 9 are so placed on the sheet that the ratio and proportion will be maintained by having the two liquids always opposite one of these lines.

Figure 5:
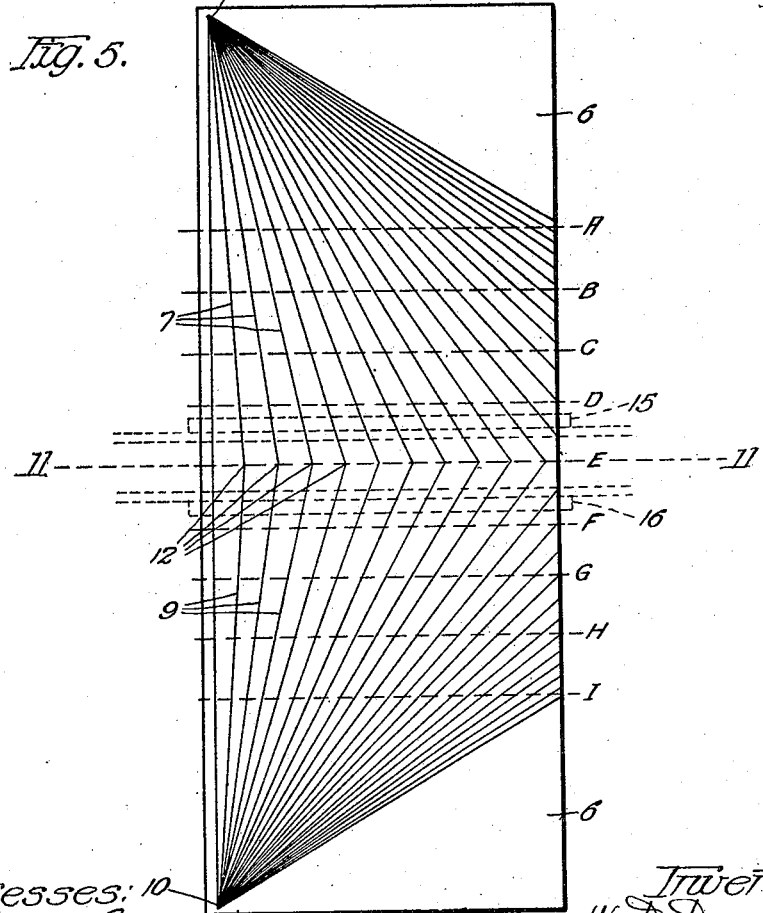
Fig. 5 is a diagram of the chart or sheet which constitutes the face of the instrument, upon which the lines or graduations appear, showing the relative arrangement of said lines or graduations.

As shown in Fig. 5, lines can be drawn horizontally across the sheet, and lettered or numbered on the sheet as shown. These lines can represent different conditions and can be used by the engineer in determining the adjustment of the sheet for any particular purpose. For example, these lines may represent different kinds of fuel, or some other changes in the conditions, and by placing one of these horizontal lines midway between the tubes 13 and 14 the engineer or attendant will obtain the desired result without calculation. The location of these horizontal lines (A to I inclusive) can be determined by experiment, and the spaces between the lines can, of course, be subdivided by any number of intermediate horizontal lines.

While the invention is shown in connection with a draft gage arrangement for a furnace, it is obvious that the novel features can be employed in conjunction with indicating instruments for other purposes.

The movable indicating means has a fixed path of travel, and the surface back of the indicators is movable without disturbing said indicating means. Thus no movable connections are necessary for the indicators, and the relation between the two indicators is not changed. Obviously, therefore, the broad idea of a movable or adjustable surface back of an indicator, with lines or other suitable indications on said surface, which latter preferably has a fixed path of travel, has various advantages.

What I claim as my invention is:—

1. In an instrument of the class described, adapted to be controlled by instrumentalities which are subject to varying conditions, the combination of a plurality of indicators having adjacent fixed paths of travel, so that the relative positions of the indicators are always apparent, means to provide a series of movable lines between said paths of travel, forming indicating positions along each fixed path and converging in one direction toward a common point, so that said lines have a constantly different angle from the first to the last.

2. An instrument as specified in claim 1, said lines being formed on a surface which is movable transversely of said paths of travel, upon which surface the lines extend a distance outside of said paths of travel, so that by such adjustment the lines appearing between said paths of travel are in effect brought closer together or spread farther apart without disturbing said indicators thereby to rectify the instrument with respect to said instrumentalities.

3. An instrument as specified in claim 1, having means forming another series of lines converging in the opposite direction, so that angles are formed where the lines of one series meet the lines of the other series, and means whereby either series of lines may be brought into operative relation to said indicators, depending upon which indicator should lead the other, or whereby said angles may be brought between said paths of travel for any situation in which the two indicators should be kept opposite each other.

4. An instrument as specified in claims 1 and 2, said surface having another series of lines converging in the opposite direction, so that the shifting of said surface one way or the other will cause either series of lines to appear either closer together or wider apart in the space between said paths of travel.

5. In an instrument of the class described, means including an indicator having movement along a predetermined fixed path of travel, a member provided with a surface having graduations forming a series of spaces along said path of travel, said graduations comprising lines converging toward a common point, and means for shifting said member to in effect widen or contract said spaces.

6. A structure as specified in claim 5, said path of travel being straight, and said lines being disposed with the first line at an angle to said path of travel and with each succeeding line at a lesser angle thereto.

7. A structure as specified in claim 5, and a second indicator having a path of travel parallel with that of said first indicator, with said lines extending across both paths of travel, so that the spaces between said lines are wider along one path of travel than along the other path of travel.

8. A structure as specified in claims 5 and 7, in combination with a furnace, means to control one indicator by the differential between the draft over the fire and the draft at the damper of said furnace, and means to control the other indicator by the draft over the fire.

9. A structure as specified in claim 1, in combination with a furnace, means to control one indicator by the draft over the fire of the furnace, and means to control another indicator by the differential between said draft and the draft at the damper of said furnace.

10. In an instrument of the class described, adapted to be controlled by instrumentalities which are subject to varying conditions, the combination of an indicator having a predetermined fixed path of travel, indicating means arranged along said path of travel, representing different positions of the indicator, and adjustable means for in effect changing the distance between said positions, thereby to rectify said indicating means with respect to variations in said instrumentalities.

11. A structure as specified in claim 10, and a second indicator, said indicating means being common to both indicators, so that the proper relation between said indicators may be indicated.

12. A structure as specified in claims 1 and 2, and means on said surface to indicate different adjustments thereof.

13. A structure as specified in claim 5, having lines extending across said surface to indicate different degrees of adjustment of said member.

14. In an instrument of the class described, the combination of indicating means having a predetermined fixed path of travel, means to provide a surface having lines thereon which provide graduations or spaces along said path of travel, and means operable without disturbing said indicating means for shifting the second named means to vary the relation of said lines to said indicating means.

15. A structure as specified in claim 14, said indicating means comprising a glass tube with an indicating liquid therein, and said lines extending at angles to said tube.

16. A structure as specified in claim 14, said path of travel being straight, and said lines crossing said path of travel at such angles that the lines all converge to a common point.

17. In an instrument of the class described, the combination of movable indicating means, means to provide a surface having indicating instrumentalities thereon arranged in operative relation to said movable indicating means, so that the extent of movement of said indicating means will be indicated, and means for causing movement of said surface to vary the relation of said indicating instrumentalities to said movable indicating means, thereby to rectify the instrument for varying conditions.

18. In an indicating instrument, the combination of indicating means having movement in response to variable conditions, means to form a surface back of said indicating means, with indications on said surface, and means to shift said surface to bring different portions thereof into operative relation to said indicating means.

WILLIAM D. DREISKE.